United States Patent
Chapman

(10) Patent No.: US 12,015,753 B1
(45) Date of Patent: Jun. 18, 2024

(54) CORRELATION MARK DESTROYED ON COPY

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/200,413

(22) Filed: May 22, 2023

(51) Int. Cl.
 *H04N 1/32* (2006.01)
 *G06T 1/00* (2006.01)
 *H04N 1/44* (2006.01)

(52) U.S. Cl.
 CPC ....... *H04N 1/32347* (2013.01); *G06T 1/0042* (2013.01); *H04N 1/32352* (2013.01); *H04N 1/4446* (2013.01); *G06T 2201/0064* (2013.01); *H04N 2201/3233* (2013.01); *H04N 2201/3271* (2013.01)

(58) Field of Classification Search
 CPC .......... H04N 1/32347; H04N 1/32352; H04N 1/4446
 See application file for complete search history.

(56) References Cited

U.S. PATENT DOCUMENTS

| | | | |
|---|---|---|---|
| 5,734,752 | A | 3/1998 | Knox |
| 8,009,329 | B2 | 8/2011 | Bala et al. |
| 8,743,425 | B2 * | 6/2014 | Simske .............. H04N 1/00045 358/1.6 |
| 8,892,995 | B2 | 11/2014 | Hoppenot et al. |
| 9,614,995 | B1 | 4/2017 | Chapman |
| 10,051,156 | B2 | 8/2018 | Chapman et al. |
| 10,452,964 | B1 * | 10/2019 | Chapman ......... G06K 19/06037 |
| 10,999,466 | B1 | 5/2021 | Chapman |
| 2023/0291858 | A1 * | 9/2023 | Kunieda ............ H04N 1/32267 |

OTHER PUBLICATIONS

"Fraud-Resistant Effects That Protect Your Most Sensitive Documents," 2019 Xerox Corporation.
"Xerox® Specialty Imaging: Fraud Deterrent Technology," https://www.xerox.com/en-us/digital-printing/fraud-deterrent-technology, 2023 Xerox Corporation.
"Thriving in the Era of Digital Transformation," 2017 Xerox Corporation.
"XMPie® Variable Data Printing Solutions," https://www.xerox.com/en-bd/digital-printing/workflow/xmpie-variable-data-printing-solutions, 2023 Xerox Corporation.

* cited by examiner

*Primary Examiner* — Barbara D Reinier
(74) *Attorney, Agent, or Firm* — Ortiz & Lopez, PLLC; Kermit D. Lopez; Luis M. Ortiz

(57) ABSTRACT

A security apparatus and a method for rendering a security mark can involve creating a security mark that includes a correlation mark having a correlation effect and comprising black pixels and white pixels, and subjecting the security mark to a filter that can removes at least some of the black pixels or the white pixels so that the correlation effect no longer functions and the security mark is not visible when rendered on a recording medium.

20 Claims, 20 Drawing Sheets

CORRELATION MARK DESTROYED ON COPY

TECHNICAL FIELD

Embodiments are related to image processing methods, systems and devices. Embodiments also relate to printing devices and techniques. Embodiments further relate to improved methods, devices, and systems for rending security marks such as watermarks and preventing copying and counterfeiting of materials upon which such marks are rendered.

BACKGROUND

In conventional printing processes that require security measures, a pattern color space having specialty imaging characteristics can be used to provide security measures and prevent counterfeiting of printed materials. Furthermore, in conventional printing processes, a pattern color space can be used, in part on variable data, such as printing logos, serial numbers, seat locations, or other types of unique identifying information on printed materials.

Security is an important requirement in many document production applications. In situations such as official or government document printing, event ticket printing, financial instrument printing and the like, many documents must be protected against copying, forging and/or counterfeiting. To accomplish this, printed documents often include security marks or security features that serve to prevent counterfeiting and/or identify a document as original.

Thus, in security applications, it may be desirable to add information to a document in the form of a security mark or a security feature that may prevent or hinder alterations and counterfeiting. Specialty imaging has been used, conventionally, in printed materials to provide fraud protection and anti-counterfeiting measures for such security applications. Some examples include prescriptions, contracts, documents, coupons, and tickets. Typically, several specialty-imaging techniques can be used at various positions in a document. In addition, these security elements may in some cases conflict with the overall aesthetics of the document.

In the area of security printing, documents are protected from copying, forging, and counterfeiting using multiple techniques. Specialty Imaging is one such method of security printing which uses standard material such as papers inks and toners. Typically, security printing companies in the marketplace require special (expensive) materials. An example document is a prescription where a pharmacist would like to be able to have a high level of confidence that the document is genuine.

Many security printing effects either are destroyed or degraded by scanning or copying. This is often desired so as to distinguish the original from the copy. A smaller subset of documents may involve cases where a copy of a document or the original document can be used and hence it is desired to have a security effect that can survive a copy or scan. Examples of such documents include a Veteran's DD 214 form and social security cards.

Imaging CR (correlation) mark text is a popular anti-counterfeiting and anti-forging method that can be used to protect valuable documents such as prescriptions and concert tickets. The CR mark text is generally invisible unless viewed with a decoding key. These were originally provided as a set of fonts.

VPCR (Vector Pattern CR) effects have replaced the original CR fonts in a number of products. These were released as a set of vectors in a pattern ink and may be used with any font or graphic. One issue remains, however, in the mark is able to be copied on a standard office copier. An ongoing exists to prevent such marks from being copied.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide for improved printing devices and rendering techniques.

It is yet another aspect of the embodiments to provide for an improved security apparatus and method for rendering such a security apparatus.

It also an aspect of the embodiments to provide for a document security method, apparatus and system for creating a correlation mark that will not be preserved when a document is copied or scanned.

The aforementioned aspects and other objectives and advantages can now be achieved as described herein. In an embodiment, a method for rendering a security mark, can involve: creating a security mark comprising a correlation mark having a correlation effect and comprising black pixels and white pixels, and subjecting the security mark to a filter that removes at least some of the black pixels or the white pixels so that the correlation effect no longer functions and the security mark is not visible when rendered on a recording medium.

In an embodiment, the filter may comprise a modulation transfer function.

An embodiment can involve configuring the security mark according to a set of ranges, including a first range determined wherein the correlation mark is unreadable without a key in an original, a second range determined wherein the correlation mark is readable with a key in the original and which overlaps the first range, a third range determined that is unreadable in a copy without the key and which overlaps the second range, and a fourth range determined that is unreadable in the copy with the key and which overlaps the third range. Note that the third and fourth ranges are determined with respect to a copy rather than the original of the first and second ranges.

An embodiment may also involve creating a first swatch for the correlation mark beginning with a thin solid line when painting vectors and a decrease in a grey level in the correlation mark, which lowers an amount of available black pixels, and creating a second swatch for the correlation mark wherein a width of the solid line of the painted vectors is grown, which lowers an amount of available white pixels.

An embodiment can also involve creating a swatch for the correlation mark using a thin painting width and by varying a gray level from 100% to 0%.

In an embodiment, the security mark can comprise a watermark.

In an embodiment, a security apparatus can include a security mark comprising a correlation mark having a correlation effect and comprising black pixels and white pixels, and a filter that can remove at least some of the black pixels or the white pixels from the security mark so that the correlation effect no longer functions and the security mark is not visible when rendered on a recording medium.

In an embodiment, the security mark can operate according to a set of ranges including a first range determined wherein the correlation mark is unreadable without a key in an original, a second range determined wherein the correlation mark is readable with a key in the original and which overlaps the first range, a third range determined that is unreadable in a copy without the key and which overlaps the second range, and a fourth range determined in the copy that is unreadable with the key and which overlaps the third range. As discussed earlier, the third and fourth ranges are determined with respect to a copy rather than the original of the first and second ranges.

In an embodiment, the security apparatus can further include a first swatch for the correlation mark beginning with a thin solid line when painting vectors and a decrease in a grey level in the correlation mark, which lowers an amount of available black pixels, and a second swatch for the correlation mark wherein a width of the solid line of the painted vectors is grown, which lowers an amount of available white pixels.

In an embodiment, the security apparatus can further include a swatch for the correlation mark beginning with a thin solid line when painting vectors and a decrease in a grey level in the correlation mark, which lowers an amount of available black pixels.

An embodiment of the security apparatus can further include at least one other swatch for the correlation mark wherein a width of the solid line of the painted vectors is grown, which lowers an amount of available white pixels.

An embodiment of the security can comprise a swatch for the correlation mark using a thin painting width and by varying a gray level from 100% to 0%.

In an embodiment, a system for rendering a security mark, can include at least one processor and a memory, the memory storing instructions to cause the at least one processor to perform: creating a security mark comprising a correlation mark having a correlation effect and comprising black pixels and white pixels; and subjecting the security mark to a filter that removes at least some of the black pixels or the white pixels so that the correlation effect no longer functions and the security mark is not visible when rendered on a recording medium.

In an embodiment of the system, the instructions can further cause the at least one processor to perform configuring the security mark according to a set of ranges comprising a first range determined wherein the correlation mark is unreadable without a key in an original, a second range determined where the correlation mark is readable with a key in the original and which overlaps the first range, a third range determined that is unreadable in a copy without the key and which overlaps the second range, and a fourth range determined that is unreadable in the copy with the key and which overlaps the third range. The third and fourth ranges are determined with respect to a copy rather than the original of the first and second ranges.

In an embodiment of the system, the instructions can cause the at least one processor to perform: creating a first swatch for the correlation mark beginning with a thin solid line when painting vectors and a decrease in a grey level in the correlation mark, which lowers an amount of available black pixels, and creating a second swatch for the correlation mark wherein a width of the solid line of the painted vectors is grown, which lowers an amount of available white pixels.

In an embodiment of the system, the instructions can cause the at least one processor to perform creating a swatch for the correlation mark beginning with a thin solid line when painting vectors and a decrease in a grey level in the correlation mark, which lowers an amount of available black pixels, and creating another swatch for the correlation mark wherein a width of the solid line of the painted vectors is grown, which lowers an amount of available white pixels.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

DETAILED DESCRIPTION

Figure 1:
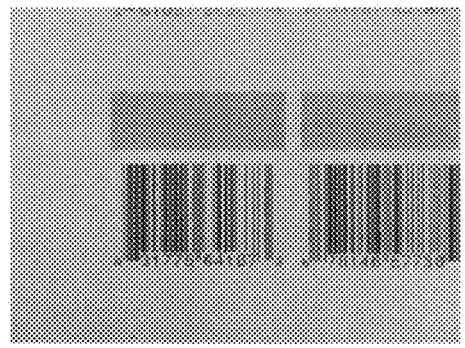
FIG. 1 illustrates an image of an example correlation mark located above barcodes and without a decoding key.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" can be by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term "metameric" as utilized herein can relate to a metameric pair of pattern ink. In a metameric pair of pattern ink (also referred to simply as a "metameric pair") the printing and paper are not visually distinguishable when viewed from one angle but are from another angle (relative to a light source) which can create a watermark without more expensive spot inks, toners, and/or printers.

The term $L^*a^*b$ (also referred to as Lab or LAB) as utilized herein relates to the CIELAB color space ($L^*a^*b$), which is a color space defined by the International Commission on Illumination (CIE). $L^*a^*b$ It expresses color as three values: $L^*$ for perceptual lightness and $a^*$ and $b^*$ for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYI color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

The term "swatch sheet" or "swatch" as utilized herein can relate to a printed sheet that contains samples of different watermarks and security features used on a particular type of document, such as a banknote, passport, certificate, etc. Swatch sheets can contain a variety of security features, such as watermarks, holograms, microprint, and security threads, among others. Each feature can be carefully designed to make it difficult to reproduce or alter the document without detection.

By using swatch sheets to test and evaluate different security features, manufacturers can select the most effective combination of features for a particular document. This can help to deter counterfeiting and protect against fraud. A swatch may relate to, for example, a single security mark where features such as color, size, font, etc., can be varied. Sometimes, swatch sheets may be used to select the working values to use as products and other times they can be by for a customer or user to select the patches to account for a particular machine as variables change.

As will be discussed in greater detail herein, a method, system and apparatus can be implemented for creating a correlation (CR) mark that will not be preserved when a document is copied or scanned. Correlation marks can be used to create security watermarks, where the mark is only visible when it is viewed through a semi-transparent decoding key. The approach discussed below, however, involves a print engine specific thin (e.g., single pixel wide) gray correlation mark, such that when copied or scanned using a typical office scanner or multifunction printer, the scanner's modulation transfer function (MTF) can act as a low pass filter that can remove some of the black or white pixels so that the correlation effect no longer works. When this scanned image is then printed and viewed though the decoding key, the watermark is no longer visible.

FIG. 1 illustrates an image 10 showing example correlation marks located above barcodes and without a decoding key. The image 10 thus depicts two correlation marks, each located above a bar code. For example, a bar code is shown at the left side of the image 10 with the bar code number 3177564187 and the bar code number at the right side of the image 10 containing the bar code number 7814667738.

Figure 2:
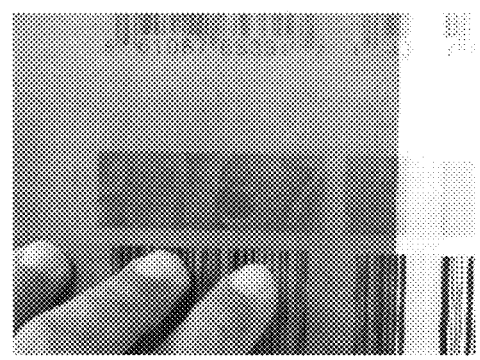
FIG. 2 illustrates an image of an example correlation mark with a decoding key.

FIG. 2 illustrates image 20 of an example correlation mark with a decoding key. That is, the image 20 depicted in FIG. 2 shows a more detailed view of the bar code indicated on the left side of FIG. 1 and having the bar code number 3177564187. A decoding key can be placed above the bar code as shown in the image 20 of FIG. 2 to reveal the numbers 4187 in the correlation mark above the bar code having the bar code number 3177564187.

Figure 3:
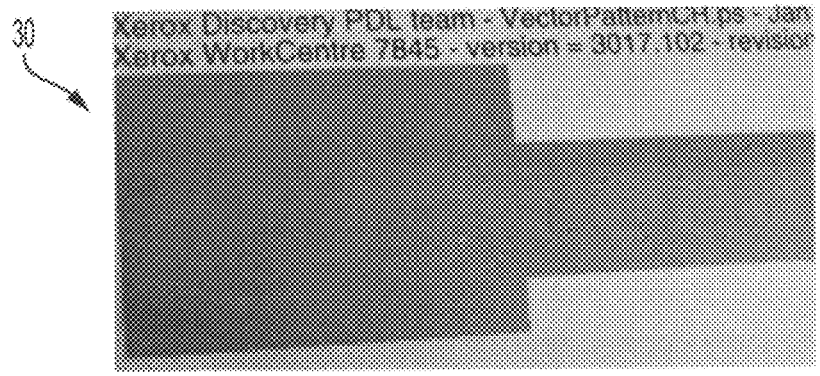
FIG. 3 illustrates an image of a VPCR mark without a decoding key.

FIG. 3 illustrates an image 30 of a VPCR mark 30 without a decoding key. Note that the acronym VPCR refers to a "Vector Pattern Correlation Mark". VPCR is a type of security feature that can be used on documents, such as banknotes, to deter counterfeiting. VPCR works by embedding a complex pattern of lines and shapes into the document, which can be difficult to reproduce accurately. This pattern can be then used to create a unique code that can be associated with a specific document. When the document is scanned or copied, the software can compare the pattern on the original document with the pattern on the scanned or copied version to detect any discrepancies. This can help to identify counterfeit documents and deter fraud. Note that the VPCR mark 30 shown in FIG. 3 is provided for illustrative purposes only and is not considered a limiting feature of the embodiments. Other types of correlation marks may be utilized in place of a VPCR mark in other embodiments.

Figure 4:
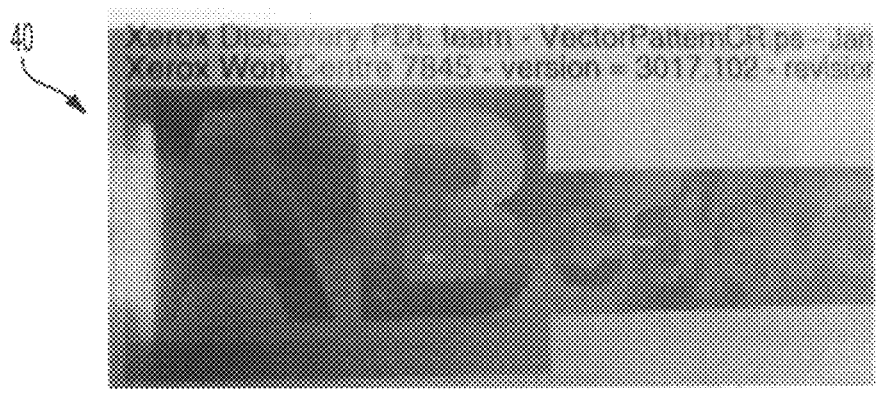
FIG. 4 illustrates an image of the VPCR mark shown in FIG. 3 with a decoding key.

FIG. 4 illustrates an image 40 of the VPCR mark shown in FIG. 3 with a decoding key. In the image 40 depicted in FIG. 4, the letters "ABcdefg" appear.

The disclosed approach cab involve the creation of a swatch sheet of correlation mark text using a thin (e.g., single pixel) painting width and varying the gray level from 100→0%. An operation can be performed to print and view without the decoding key following by noting which patches are unreadable. The decoding key can be then used to note which patches are readable and overlap with the unreadable patches in the previous step. In the next step or operation, the previous sheet can be copied and viewed without the decoding key. The patches that are unreadable and which overlap with the prior steps can then be noted. The decoding key can be then used to note which patches are unreadable and overlap with the previous steps. Next, a step or operation can be implemented to note all four conditions must be met to be considered working. This area should be in the lighter section where mostly white (paper) exists.

Figure 5:
FIG. 5 illustrates an image of a PDF file of a first swatch sheet, in accordance with an embodiment.
Figure 6:
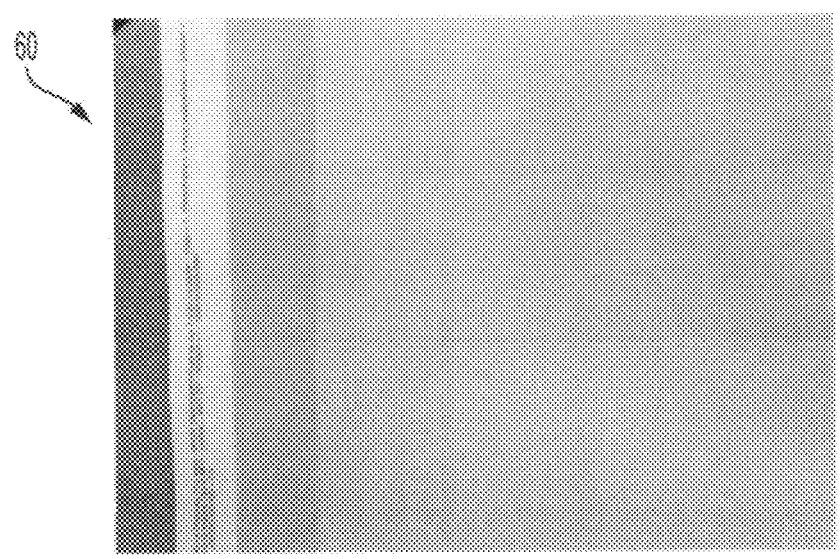
FIG. 6 illustrates an image of the swatch sheet depicted in FIG. 5, in accordance with an embodiment.

FIG. 5 illustrates an image 50 of a PDF file of a first swatch sheet, in accordance with an embodiment. FIG. 6 illustrates an image 60 of the swatch sheet depicted in FIG. 5, in accordance with an embodiment.

Figure 7:
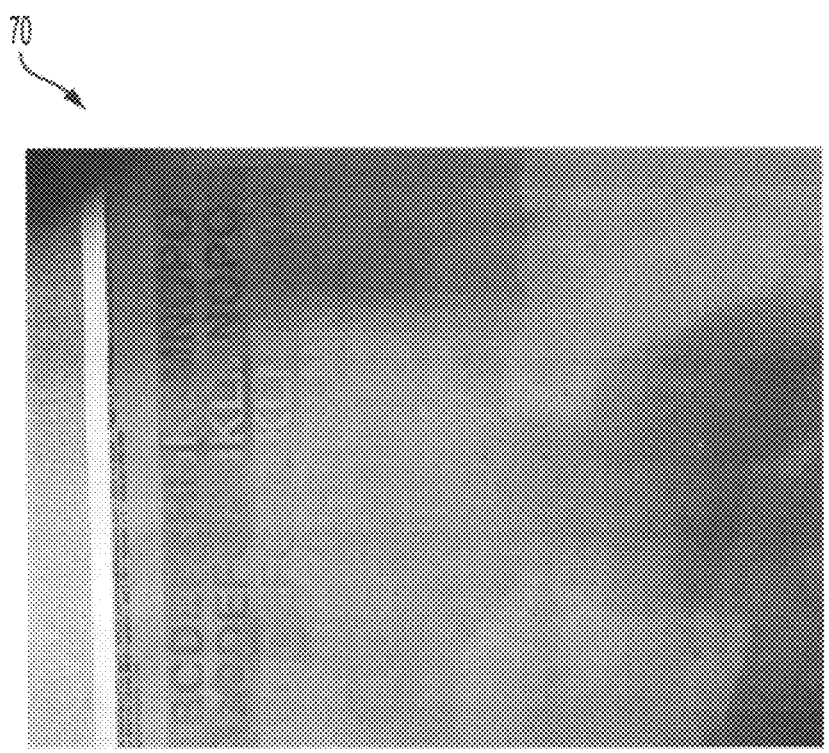
FIG. 7 illustrates an image of the swatch sheet shown in FIG. 6 with a key, in accordance with an embodiment.

FIG. 7 illustrates an image 70 of the swatch sheet shown in FIG. 6 with a decoding key, in accordance with an embodiment. As shown in FIG. 7, various letters such as B, C, D, E, F, etc. are shown with respect to the decoding key.

Figure 8:
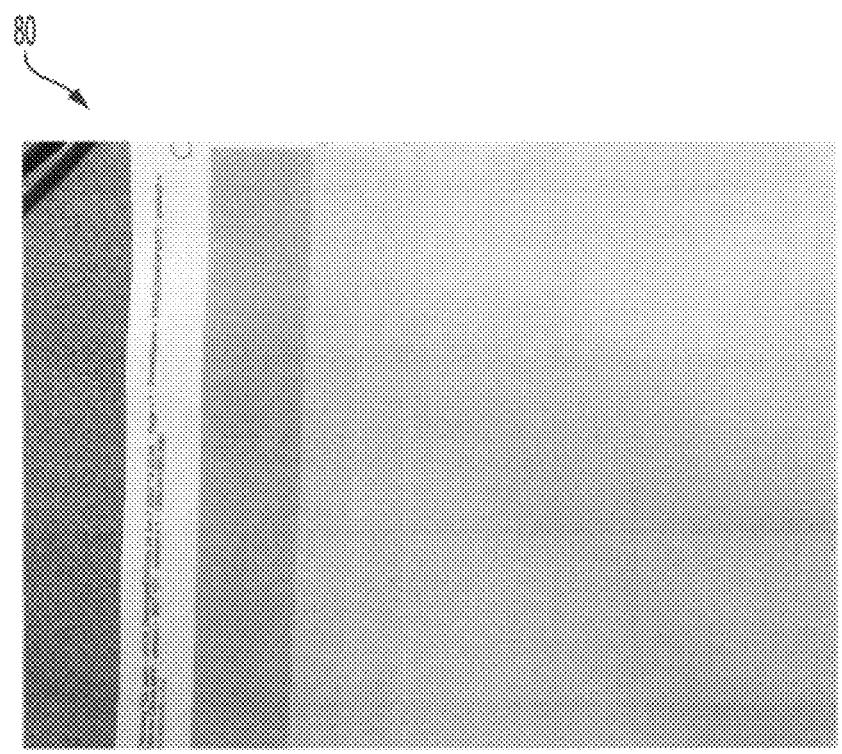
FIG. 8 illustrates an image of a copy made from the swatch shown depicted in FIG. 7, in accordance with an embodiment.

FIG. 8 illustrates an image 80 of a copy made from the swatch shown depicted in FIG. 7, in accordance with an embodiment. Note that in the image 80 shown in FIG. 8, the various letters B, C, D, E, F, etc., which were shown in the image 70 of FIG. 7 are no longer visible.

Figure 9:
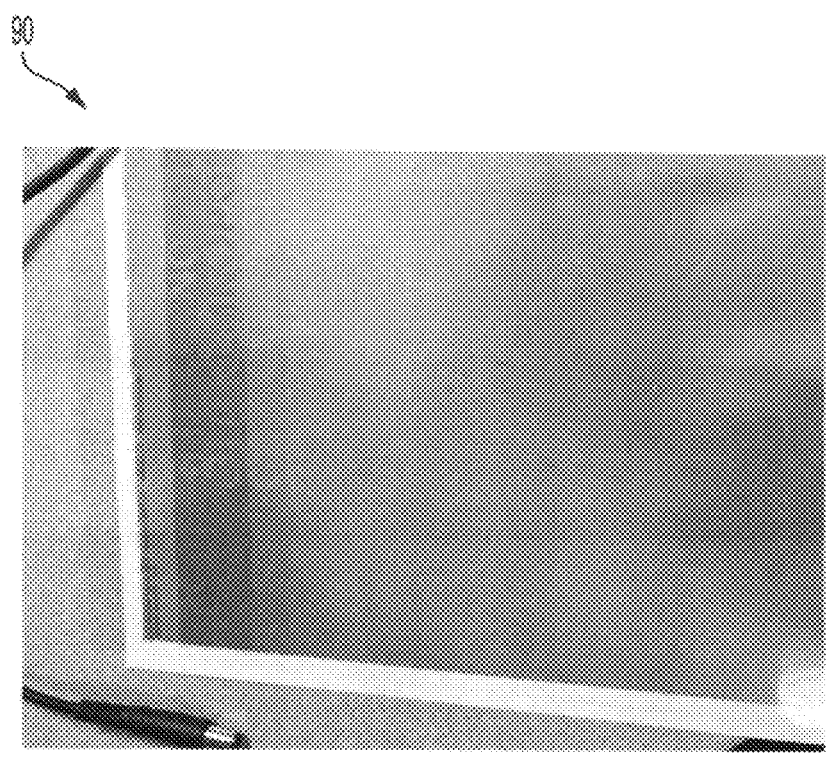
FIG. 9 illustrates an image of the copy shown in FIG. 8 with a decoding key, in accordance with an embodiment.

FIG. 9 illustrates an image 90 of the copy shown in FIG. 8 with a decoding key, in accordance with an embodiment. Some of the letters B, C, D, E, F, etc. are visible in the image 90. Note that there are only four patches that meet all four conditions with the fourth patch from the left starting to become readable in the copy with the decoding key and the seventh starting to becoming unreadable in the original with the decoding key. These are chosen for the product and the rest are not used.

Figure 10:
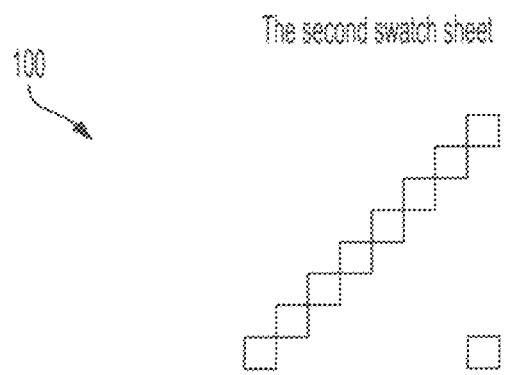
FIG. 10 illustrates a schematic diagram depicting a background cell in accordance with an embodiment.

FIG. 10 illustrates a schematic diagram depicting a background cell 100 in accordance with an embodiment. FIG. 10 shows a rendered pattern ink cell of 8×8 pixels with a line width of 1 pixel which is the smallest allowable width on this device. As the line width increased it would turn this cell into 100% black.

Figure 11:
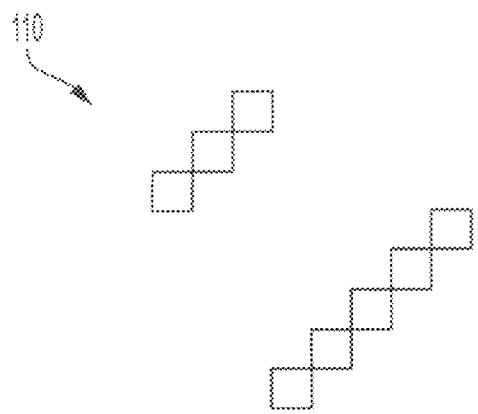
FIG. 11 illustrates a schematic diagram depicting a foreground cell in accordance with an embodiment.

FIG. 11 illustrates a schematic diagram depicting a foreground cell 110 in accordance with an embodiment. FIG. 11 shows a rendered pattern ink cell that is the same frequency as shown in FIG. 10, but 180 degrees out of phase meaning that if both pattern cells are written on top of each other, the resulting pattern has a frequency twice that of the documents shown in the images in FIGS. 5 and 6 since the correlation (CR) effect uses the background (e.g., a text box) and the foreground for the text.

Starting at 1 pixel and incrementing in small steps demonstrates that the CR effect has good hiding capabilities without a decoding key and is readable with the decoding key until line width is 3. A copy has good hiding capabilities without a decoding key. Decodes well with the key from 1-1.625 pixels, is mediocre decoding from 1.625-1.875 pixels and barley decodes above 1.875 pixels. Selecting 1.0 pixels far a copyable CR make and 2.0 pixels for a non-copyable CR mark with results show below with respect to FIGS. 12 to 21.

Figure 12:
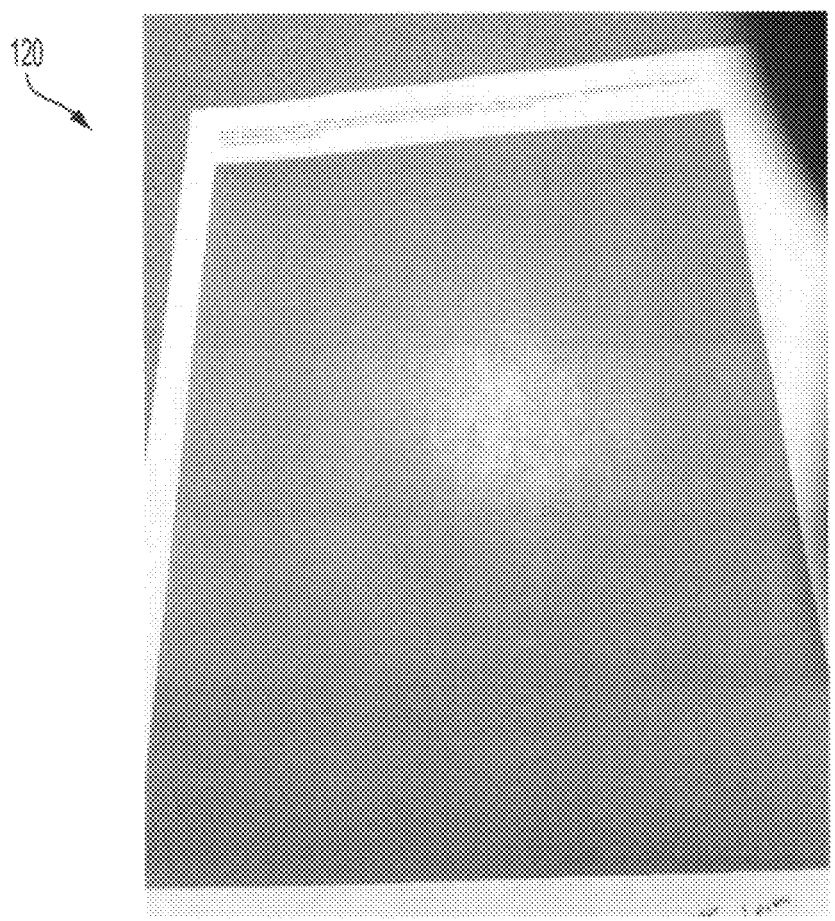
FIG. 12 illustrates an image of an original document with 1.0 pixels, in accordance with an embodiment.
Figure 13:
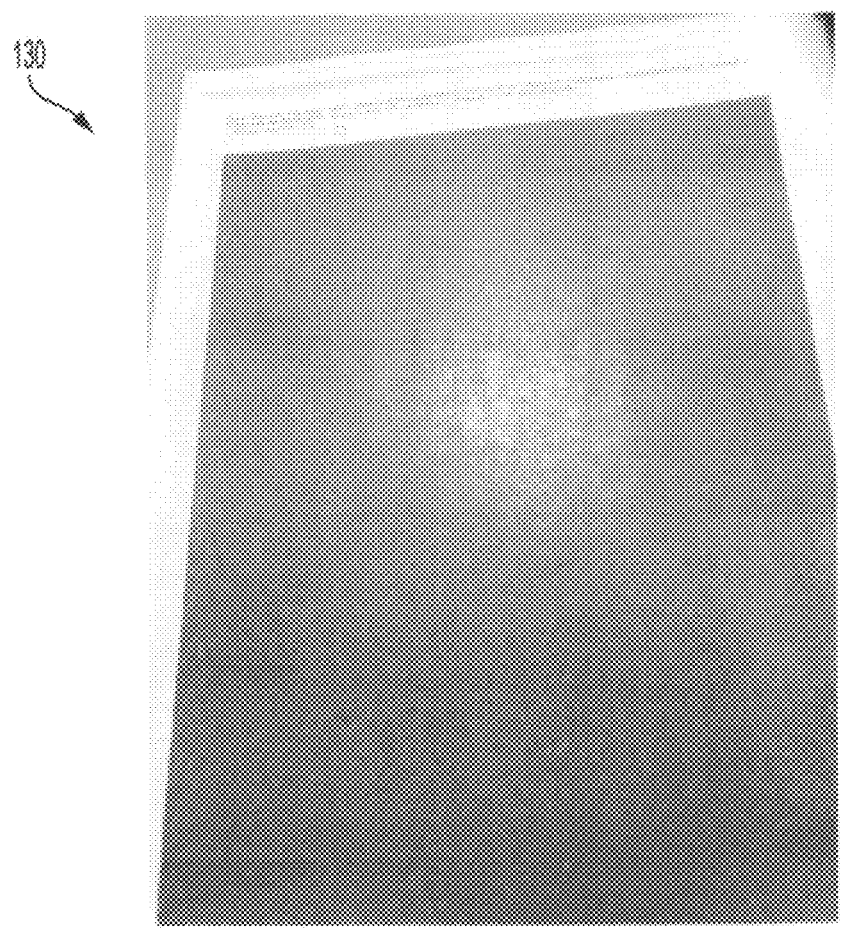
FIG. 13 illustrates an image of an original document with 2 pixels, in accordance with an embodiment.

FIG. 12 illustrates an image 120 of an original document with 1.0 pixels, in accordance with an embodiment. FIG. 13 illustrates an image 130 of an original document with 2 pixels, in accordance with an embodiment.

Figure 14:
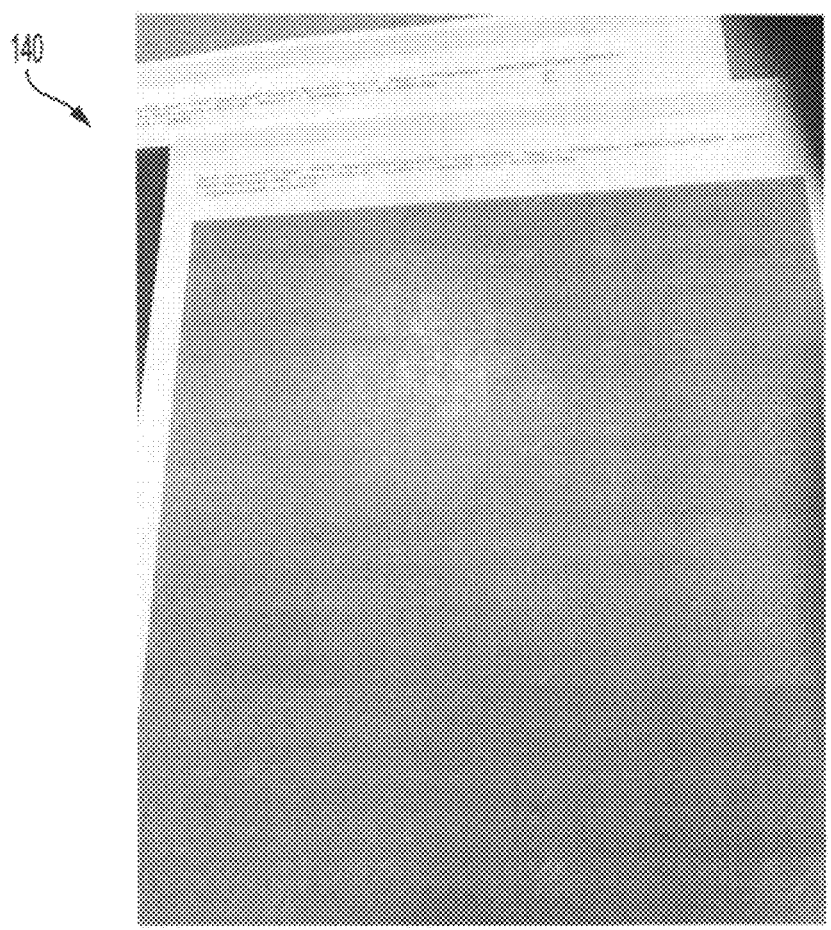
FIG. 14 illustrates an image of a copy with 1 pixel, in accordance with an embodiment.
Figure 15:
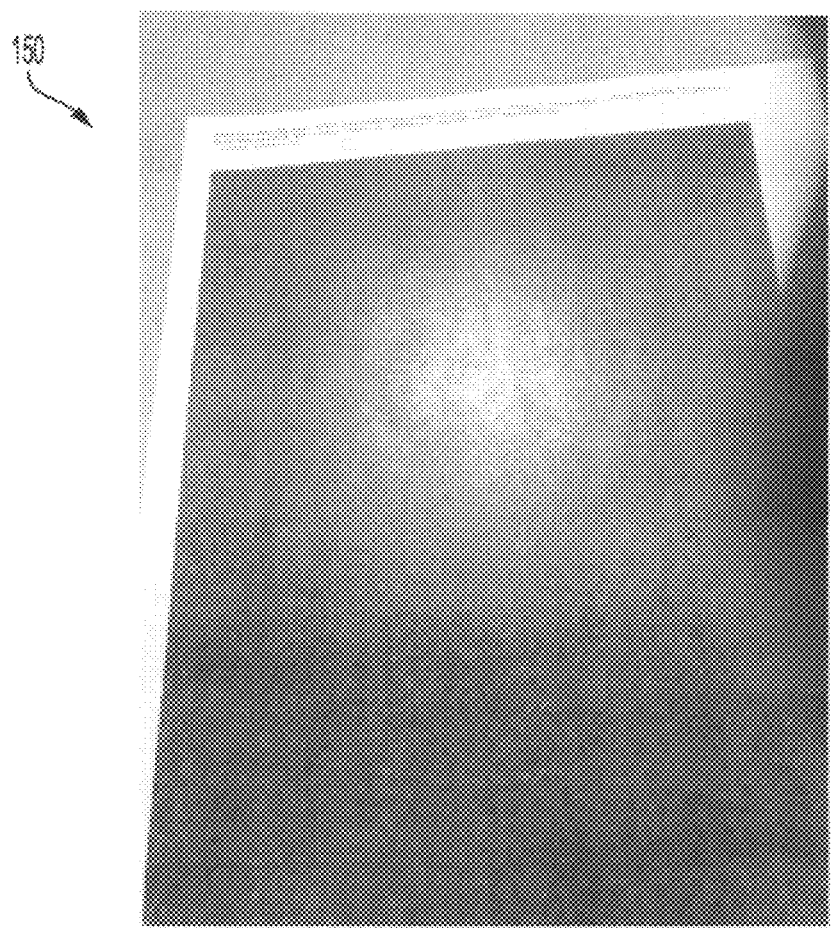
FIG. 15 illustrates an image of a copy with 2 pixels, in accordance with an embodiment.
Figure 16:
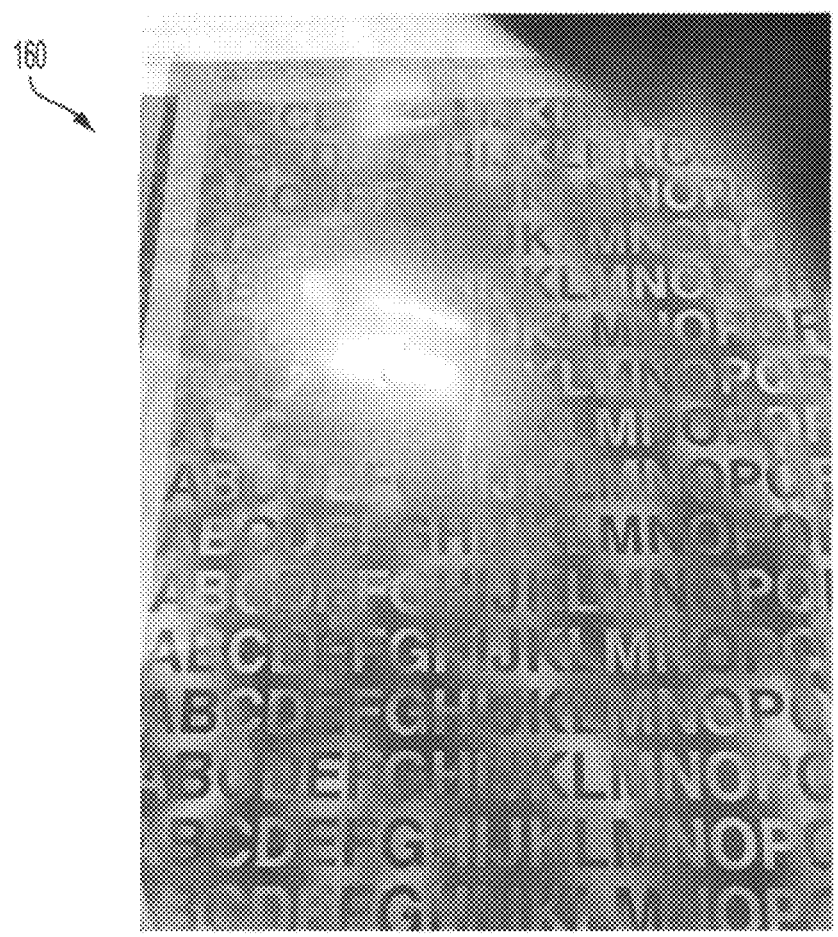
FIG. 16 illustrates an image of an original document with 1 pixel in association with a decoding key, in accordance with an embodiment.
Figure 17:
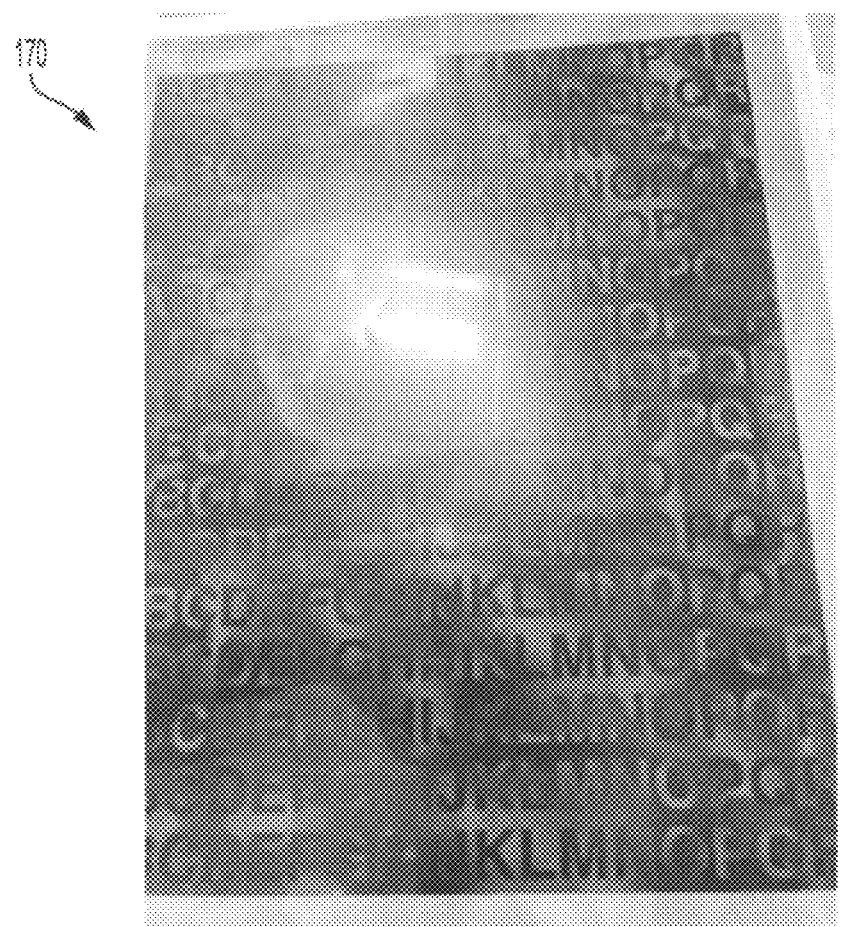
FIG. 17 illustrates an image of an original document with 2 pixels in association with a decoding key, in accordance with an embodiment.

FIG. 14 illustrates an image 140 of a copy with 1 pixel, in accordance with an embodiment. FIG. 15 illustrates an image 150 of a copy with 2 pixels, in accordance with an embodiment;

FIG. 16 illustrates an image 160 of an original document with 1 pixel in association with a decoding key, in accordance with an embodiment. FIG. 17 illustrates an image 170 of an original document with 2 pixels in association with a decoding key, in accordance with an embodiment.

Figure 18:
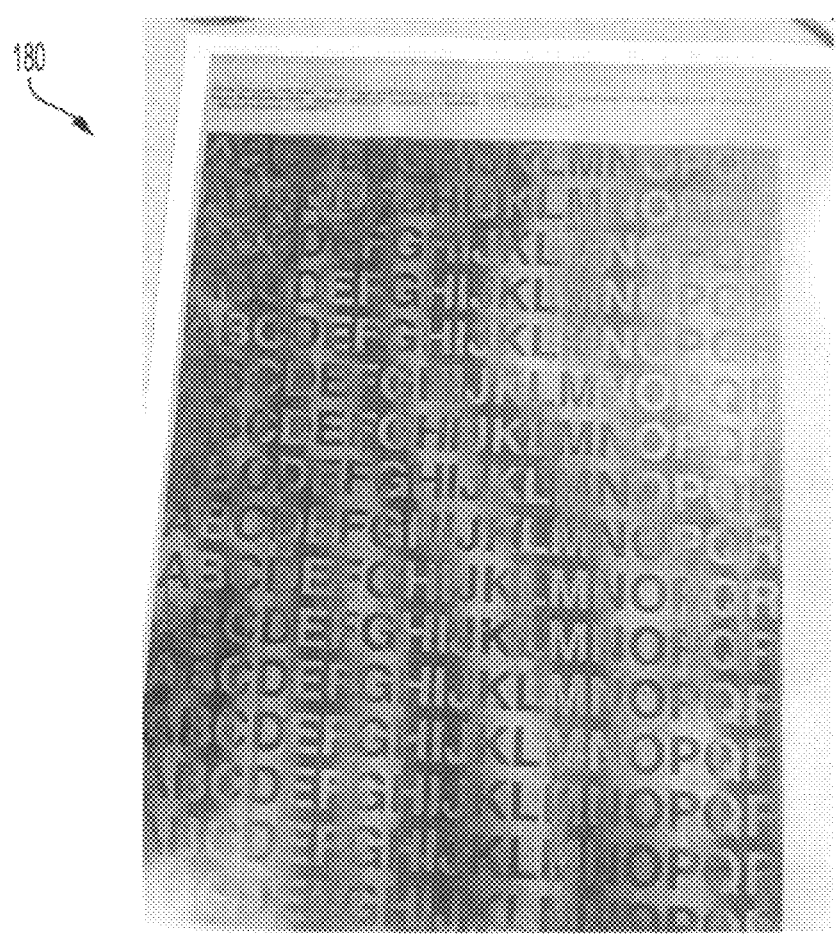
FIG. 18 illustrates an image of a copy of a document with 1 pixel and a decoding key, in accordance with an embodiment.
Figure 19:
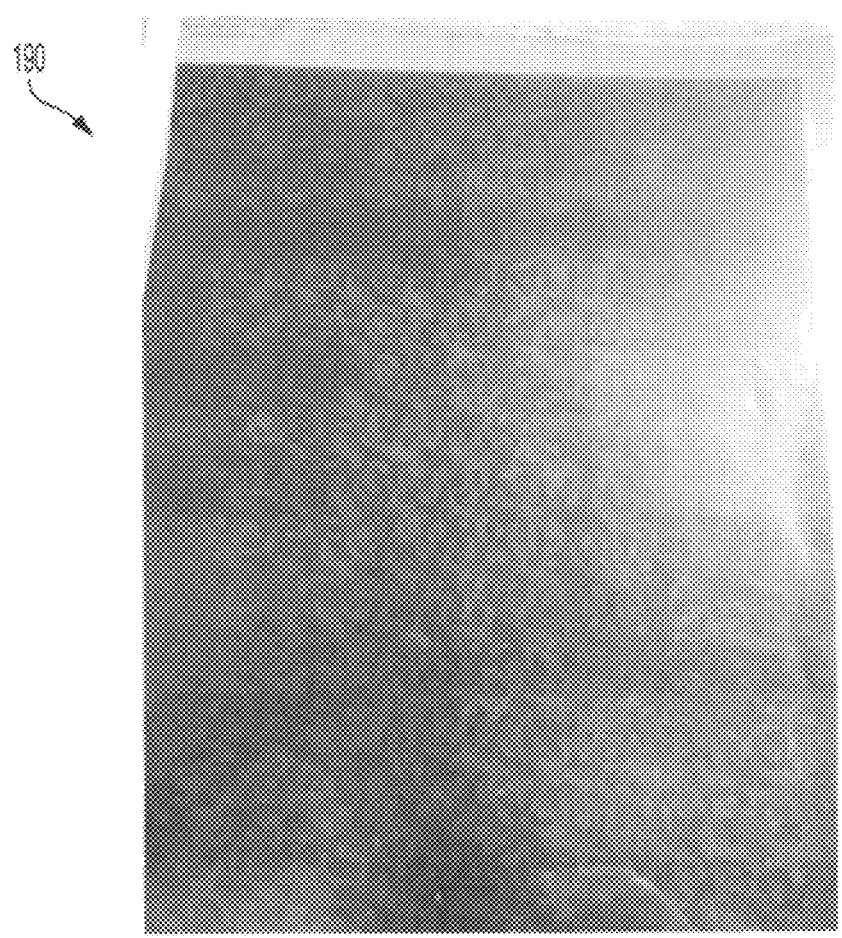
FIG. 19 illustrates an image of a copy of a document with 2 pixels and a decoding key, in accordance with an embodiment.

FIG. 18 illustrates an image 180 of a copy of a document with 1 pixel and a decoding key, in accordance with an embodiment. FIG. 19 illustrates an image 190 of a copy of a document with 2 pixels and a decoding key, in accordance with an embodiment.

Figure 20:
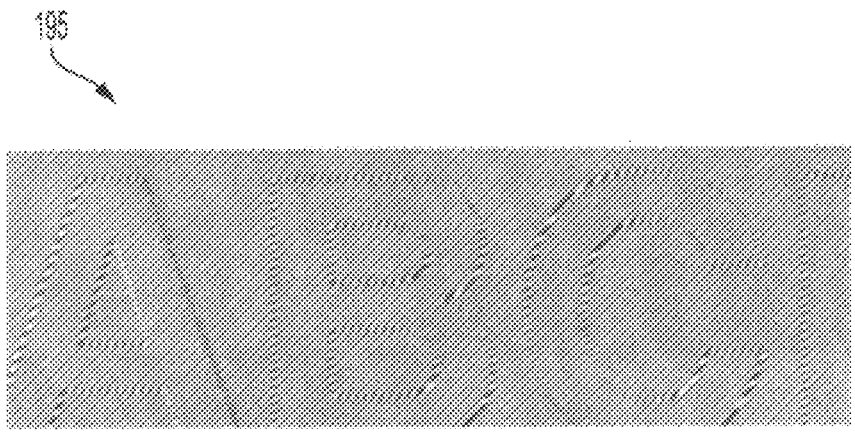
FIG. 20 illustrates an image of a copyable and scanned correlation mark, in accordance with an embodiment.
Figure 21:
FIG. 21 illustrates an image of a non-copyable and scanned correlation mark, in accordance with an embodiment.

FIG. 20 illustrates an image 195 of a copyable and scanned correlation mark, in accordance with an embodiment. FIG. 21 illustrates an image 198 of a non-copyable and scanned correlation mark, in accordance with an embodiment. FIGS. 20 and 21 demonstrate a scanned swatch of the copyable and non-copyable CR mark. In the image 195 shown in FIG. 20 the letters A B C are shown more clearly than the letters A B C in the image 198 of FIG. 21.

Figure 22:
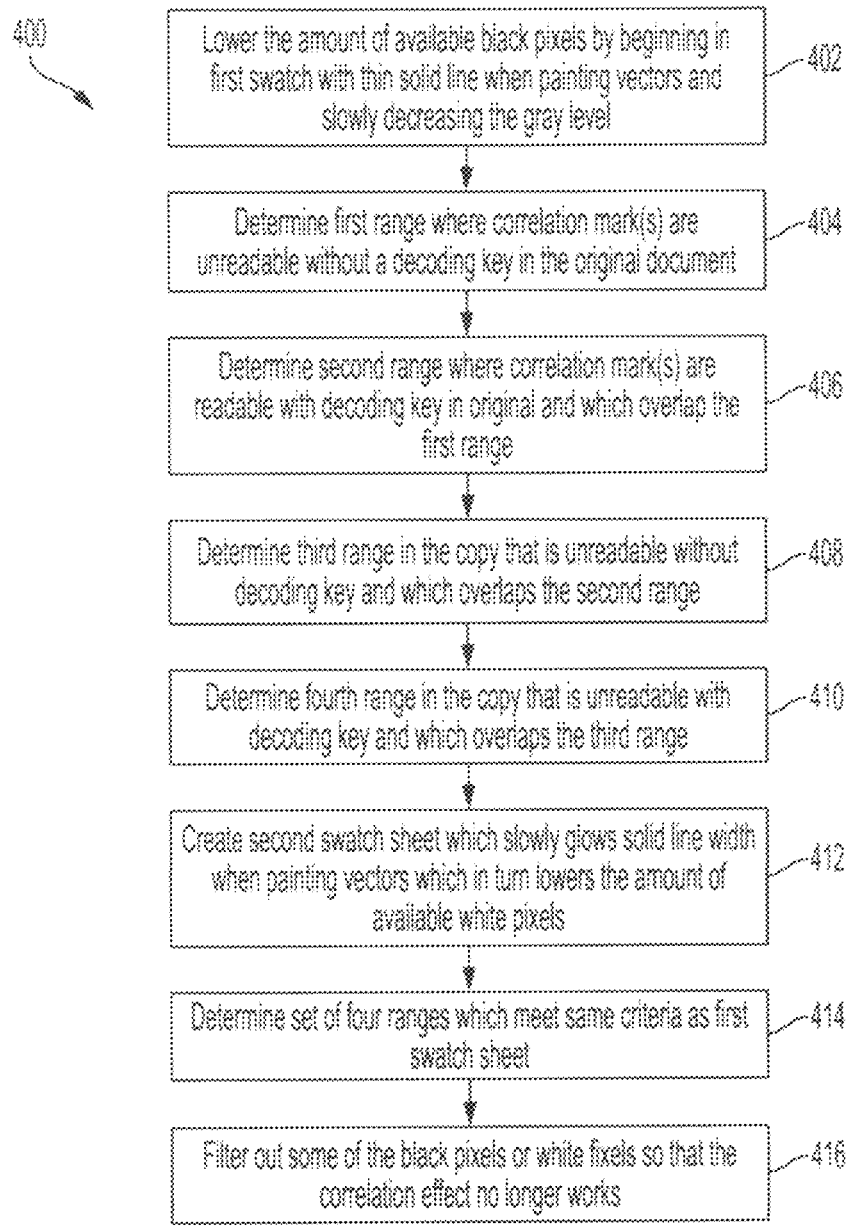
FIG. 22 illustrates a high-level flow chart of operation depicting logical operational steps of a method for rendering a document with digital invisible ink, in accordance with an embodiment.

FIG. 22 illustrates a flow chart of operations depicting logical operational steps of a method 400 for document security, which can be implemented in accordance with an embodiment. A shown at block 402, a step or operation can be implemented to lower the amount of available black pixels in a first swatch sheet by beginning with a thin solid line when painting vectors and slowly decreasing the gray level. Note that the term "swatch sheet" as utilized herein may be utilized interchangeable with the term "swatch". Thus, a first swatch begins with a thin solid line when painting vectors and slowly decreases the gray level which lowers the amount of available black pixels.

Next, as shown at block 404, a step or operation can be implemented in which a first range is determined for the first swatch sheet where correlation marks are unreadable without a decoding key in the original. A second range can be then determined, as indicated at block 406 where the correlation marks are readable with a decoding key in the original and which overlaps the first range. As shown at block 408, a third range can be determined in the copy that is unreadable without the decoding key and which overlaps the second range. As depicted next at block 410, a fourth range can be determined in the copy that is unreadable with the decoding key and which overlaps the third range.

As shown next at block 412, a step or operation can be implemented to create a second swatch sheet in which a solid line width slowly grows while painting vectors which lowers the amount of available white (e.g., paper) pixels. Thereafter, as shown at block 414, a step or operation can be implemented in which a set of four ranges can be determined that meet the same criteria as the first swatch sheet. In both cases the scanner's MTF (modulation transfer function) acts as a low pass filter by filtering out some of the black or white pixels so the correlation effect no longer works, as shown at block 416.

Figure 23:
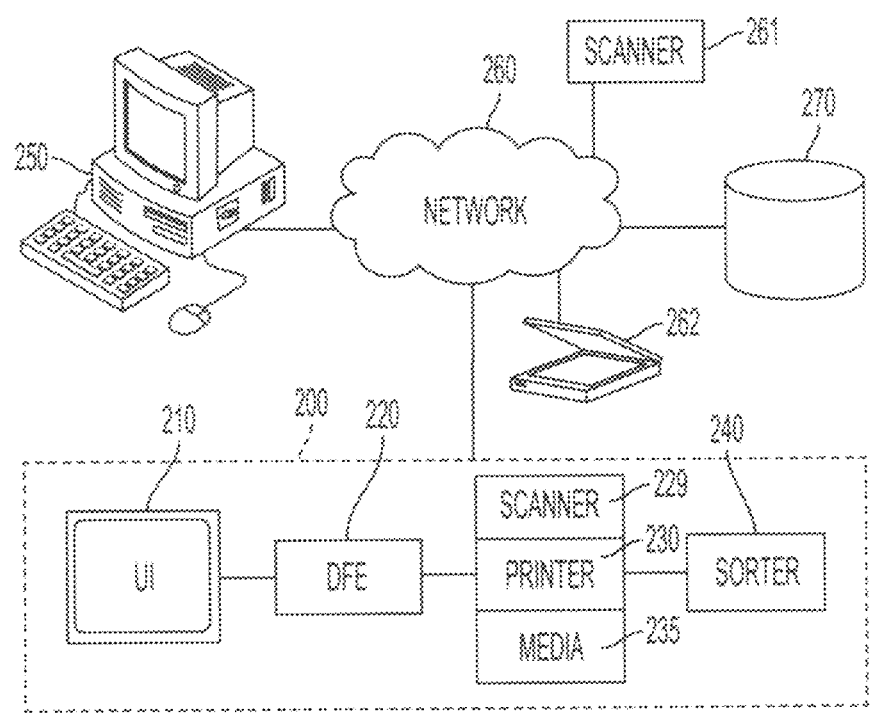
FIG. 23 illustrates a block diagram of a printing system suitable for implementing one or more of the disclosed embodiments.
Figure 24:
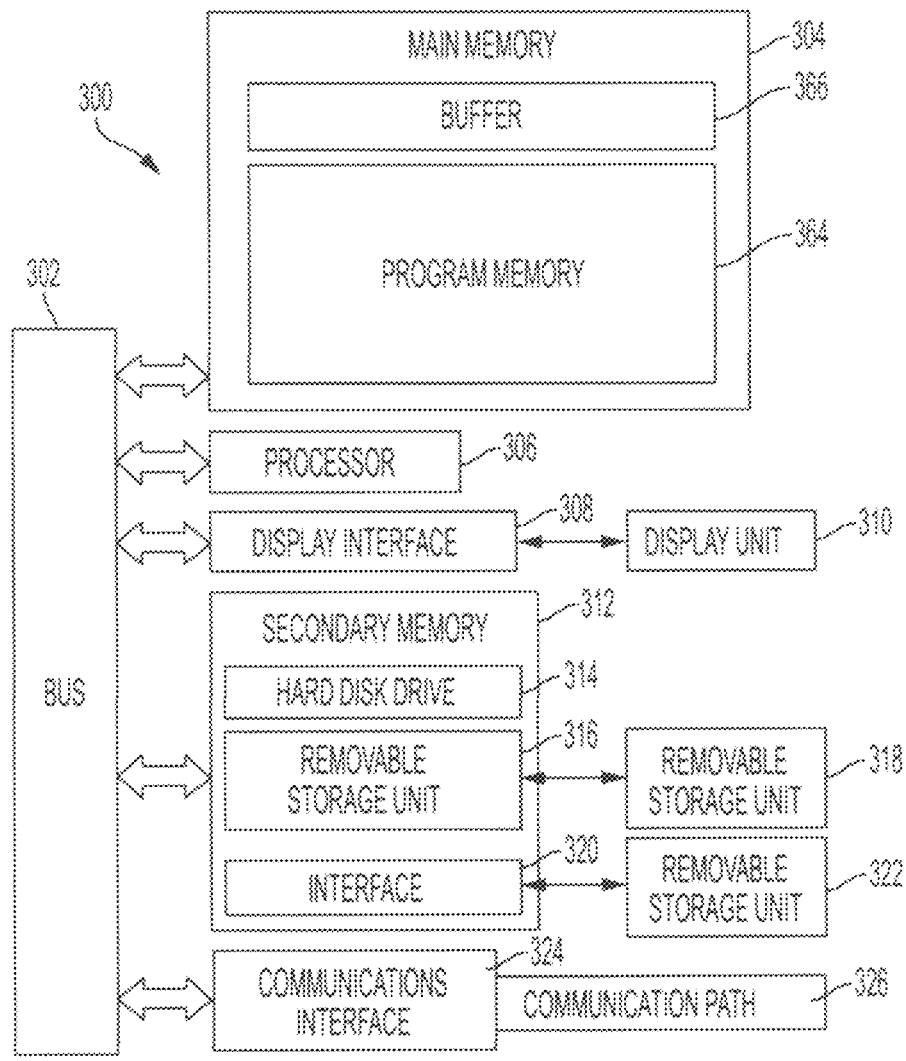
FIG. 24 illustrates a block diagram of a digital front-end controller useful for implementing one or more of the disclosed embodiments.

FIG. 23 illustrates a block diagram of a printing system 200 suitable for implementing one or more of the disclosed embodiments. FIG. 24 illustrates a block diagram of a digital front-end 300 useful for implementing one or more of the disclosed embodiments. The printing system 200 and/or the digital front-end 300 can be used to render a document with a security mark as discussed herein. In some embodiments, the digital front-end 300 shown in FIG. 24 may be used to implement the digital front-end 220 shown in FIG. 23.

With reference to FIG. 23, a printing system (or image rendering system) 200 suitable for implementing various aspects of the exemplary embodiments described herein is illustrated. The printing system 200 can implement rendering operations such as scanning a document via a scanner and printing a document via a printer, wherein the document includes the disclosed two-layer correlation mark with a variable data hiding layer.

The printing system 200 can be used to embed a hidden/invisible image or text as discussed previously into the white space of a digital document, as well as implementing a flexible system/method to convert the invisible item into a visible item. The printing system 200 can represent each invisible item in a single color that is very close to white, such as using the least significant bit of cyan, which is not discernable from white by the human eye. The printing system 200 and/or in combination with a software application or web service may be more color sensitive and can correctly recognize the presence of the hidden item.

The printing system 200 can use the previously discussed transformation table, which can be configured to define how to convert the color of the hidden item so that it can be discerned by the human eye, instead of hardcoding the transformation rules. The output of the printing system 200 can be a representation of the document where the item is plainly visible to a human.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features.

The scanner may also be incorporated into, for example, a printing system such as the printing system 200 shown in FIG. 23. For example, the scanner 229 is shown in FIG. 23 as a part of the printing system 200. Alternatively, or in addition to the scanner 229 included as a part of the printing system 200, a scanner 261 and/or a scanner 262 may communicate with the printing system 200 through the network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 200 can include a user interface 210, the previously digital front-end (DFE) 220, and one or more print engines such as a print engine 230. The print engine 230 may have access to print media 235 of various sizes and cost for a print job. In some embodiments, the printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a workstation 250. The workstation 250 can communicate bidirectionally with the printing system 200 via a communications network 260.

A user profile, a work product for printing, a media library, and various print job parameters can be stored in a database or memory 270 accessible by the workstation 250 or the printing system 200 via the network 260, or such data can be directly accessed via the printing system 200. One or more color sensors (not shown) may be embedded in the printer paper path in some embodiments.

With respect to FIG. 24, an exemplary DFE (Digital Front End) 300 is shown in greater detail. The DFE 300 can include one or more processors, such as processor 306 capable of executing machine executable program instructions. The processor 306 can function as a DFE processor. The DFE shown in FIG. 24 may be utilized as or with the digital front end 220 of the printing system 200 shown in FIG. 23

In the embodiment shown, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 can include a communications interface 324, which can act as an input and an output to allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels.

Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function (s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 8 and/or the DFE controller 300 shown in FIG. 8. A "module" can perform the various steps, operations or instructions discussed herein, such as the steps or operations discussed herein with respect to FIG. 1 to FIG. 7.

The method 70 shown in FIG. 7, for example, may be implemented, in part, in a computer program product comprising a module that may be executed by, for example, DFE controller 220 discussed previously with respect to FIG. 8. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 8).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed examples discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which the security device (e.g., a watermark) may be rendered.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a security mark, comprising:
   creating a security mark comprising a correlation mark having a correlation effect and comprising black pixels and white pixels;
   creating a swatch for the correlation mark beginning with a thin solid line when painting vectors and a decrease in a grey level in the correlation mark, which lowers an amount of available black pixels; and
   subjecting the security mark to a filter that removes at least some of the black pixels or the white pixels so that the correlation effect no longer functions and the security mark is not visible when rendered on a recording medium.

2. The method of claim 1 wherein the filter comprises a modulation transfer function.

3. The method of claim 1 further comprising configuring the security mark according to a set of ranges.

4. The method of claim 1 further comprising:
   creating a second swatch for the correlation mark.

5. The method of claim 1 wherein the security mark comprises a watermark.

6. The method of claim 1 wherein the security mark comprises a watermark and wherein the filter comprises a modulation transfer function.

7. The method of claim 6 wherein the modulation transfer function is provided by a scanner and wherein the modulation transfer function acts as a low pass filter.

8. The method of claim 1 further comprising creating the swatch for the correlation mark using a thin painting width and by varying the gray level from 100% to 0% that reflects a gray level variation by varying a black and white pixel ratio, respectively, of the black pixels and white pixels.

9. A security apparatus, comprising:
   a security mark comprising a correlation mark having a correlation effect and comprising black pixels and white pixels;
   a swatch for the correlation mark beginning with a thin solid line when painting vectors and a decrease in a grey level in the correlation mark, which lowers an amount of available black pixels; and
   a filter that removes at least some of the black pixels or the white pixels from the security mark so that the correlation effect no longer functions and the security mark is not visible when rendered on a recording medium.

10. The security apparatus of claim 9 wherein the filter comprises a modulation transfer function.

11. The security apparatus of claim 9 wherein the security mark operates according to a set of ranges.

12. The security apparatus of claim 9 further comprising:
   a second swatch for the correlation mark.

13. The security apparatus of claim 9 wherein the security mark comprises a watermark.

14. The security apparatus of claim 9 wherein the security mark comprises a watermark and wherein the filter comprises a modulation transfer function.

15. The security apparatus of claim 14 wherein the modulation transfer function is provided by a scanner and wherein the modulation transfer function acts as a low pass filter.

16. The security apparatus of claim 9 further comprising a swatch for the correlation mark created using a thin painting width and by varying the gray level from 100% to 0% that reflects a gray level variation by varying a black and white pixel ratio, respectively, of the black pixels and white pixels.

17. A system for rendering a security mark, comprising:
   at least one processor and a memory, the memory storing instructions to cause the at least one processor to perform:
      creating a security mark comprising a correlation mark having a correlation effect and comprising black pixels and white pixels;
      creating a swatch for the correlation mark beginning with a thin solid line when painting vectors and a decrease in a grey level in the correlation mark, which lowers an amount of available black pixels; and subjecting the security mark to a filter that removes at least some of the black pixels or the white pixels so that the correlation effect no longer functions and the security mark is not visible when rendered on a recording medium.

18. The system of claim 17 wherein the instructions further cause the at least one processor to perform configuring the security mark according to a set of ranges.

19. The system of claim 17 wherein the instructions further cause the at least one processor to perform:

creating a second swatch for the correlation mark.

20. The system of claim 17 wherein the filter comprises a modulation transfer function.

\* \* \* \* \*